United States Patent [19]
Welch

[11] 3,894,377

[45] July 15, 1975

[54] FASTENER CLIP

[75] Inventor: Russell M. Welch, Grand Rapids, Mich.

[73] Assignee: Modular Systems, Inc., Fruitport, Mich.

[22] Filed: Jan. 21, 1974

[21] Appl. No.: 434,870

[52] U.S. Cl. .................... 52/584; 52/511; 52/713; 52/714; 85/8.8; 403/353
[51] Int. Cl.² ......................................... F16B 12/22
[58] Field of Search ............ 52/508, 511, 713, 756, 52/584; 85/8.8; 403/353

[56] References Cited
UNITED STATES PATENTS

| | | | |
|---|---|---|---|
| 1,940,969 | 12/1933 | Randall | 52/511 |
| 2,245,751 | 6/1941 | Blackmore | 85/8.8 |
| 2,278,708 | 4/1942 | Miller | 85/8.8 X |
| 3,297,916 | 1/1967 | Wright | 85/8.8 X |
| 3,451,362 | 6/1969 | Ostling et al. | 108/60 |
| 3,491,820 | 1/1970 | Ostling | 52/474 X |
| 3,645,162 | 2/1972 | Welch | 52/285 X |

*Primary Examiner*—Alfred C. Perham
*Attorney, Agent, or Firm*—Price, Heneveld, Huizenga & Cooper

[57] ABSTRACT

Two structural members are secured together by a fastener and stud having an enlarged head. The fastener is a resilient one-piece metal clip having one or more portions secured to one of the structural members and a raised portion. The raised portion has a slot formed therein with an access opening to receive the enlarged stud head. The sides of the slot taper inwardly from the access opening to a point of minimum spacing at which point a step is formed in each side and the sides extend essentially parallel to the closed end of the slot at an increased spacing. The stud has a shaft diameter corresponding to the increased spacing portion of the slot and is locked to the fastener by positioning the head through the access opening and moving the stud to the closed end springing the tapered portions until clearing the step whereby the taper portions spring back to their normal positions and the shaft is locked behind the steps against unintentional removal.

15 Claims, 8 Drawing Figures

FASTENER CLIP

BACKGROUND OF THE INVENTION

1. Field Of Invention

This invention relates to concealed mechanical connectors, and more particularly, flexible clips therefor which lock a stud member within a slot formed in the clip.

2. Description Of The Prior Art

In U.S. Pat. No. 3,491,820 there is disclosed and claimed a flexible joint structure and clips therefor for joining two wall members together wherein the flexible clips are recessed in one of the panels. This is an extremely desirable joint because the recessed nature of the fastening means hides the fastening members from view. This is also advantageous because the fastening means can be installed in a factory, shipped knocked down, and then assembled without tools at destination. This results in a savings of shipping costs while producing a professionally finished piece of furniture. The joints are superior in many respects to conventional joints because the flexible and resilient nature of the clips maintains the joints under spring tension to permit expansion and contraction of the joints under differing moisture conditions. Other patents related to the type of joint dealt with herein which represent other successful approaches to improve joint structures in U.S. Pat. Nos. 3,645,162; 3,634,893 and 3,451,362.

The type of joints disclosed in these patents has been quite successful in telephone booths, cabinets and the like. While generally such type of structures and permanently assembled, situations do arise wherein it is necessary to disengage the two structures from each other. Heretofore, it has been necessary to provide a window or other access means to the clip in order to allow manipulation by a screw driver or other tool of the stud from the fastener clip. For example, one type of fastener in the prior art utilizes a locking flange which actually springs into abutment behind the stud when it is seated in the clip and the only way that this joint can be disengaged is to physically manipulate the locking flange from engagement with a stud. This requires the provision of an access opening to the joint and the manipulation of a prong such as a screw driver. Joints which may not require a manipulation of the tool have heretofore not been sufficiently positive in their locking function and hence disadvantageous for that reason. Thus, there is a need in this art for an improved fastener clip which provides positive locking engagement with a stud to join two structures together and yet permits disengagement without requiring access to the clip or mechanical manipulation thereof by some type of tool.

SUMMARY OF THE INVENTION

In accordance with the invention, two structural members are secured together by a fastener secured to one of the members and a stud secured to the other member. The stud has an enlarged head which is positionable in a slot in the fastener. The fastener is a flexible one-piece metal clip having at least one flange attached to one of the structural members and a raised portion. The slot is formed in the raised portion and has an access opening to allow insertion of the enlarged head of the stud which stud is secured to the other structural member. The slot has first side portions extending inwardly toward each other from the access opening to a locus of minimum width. A step is formed at the locus of minimum width and the slot has a second portion of increased width extending thereafter to the closed end. The stud diameter corresponds to the increased width portion of the slot and with the head positioned in the access opening of the slot, the stud is urged longitudinally toward the locus of minimum width camming the sides of the slot outwardly as it reaches the step. Upon clearing the step, the sides spring back resiliently to their normal position and the stud is locked securely in the portion of increased slot width. Unintentional removal of the stud is thus prevented although disengagement can be achieved with sufficient force exerted on the stud to cam the steps out of the way.

Different embodiments are envisioned to permit insertion of the stud into the open end of the slot from a position generally perpendicular to that of the clip or in a longitudinal direction with relationship to the clip. Clips with single and double end flanges can also be utilized. Also, wedging surfaces at opposite sides of the slot tapering downwardly from a point near the access opening are provided so that as the stud is moved into a locked position, it will be drawn downwardly toward the planes of the end flanges as it is moved relative to the clip in a direction from the access opening to the closed end. This provides a positive tensioning of the joint eliminating any looseness. As a result of the subject invention, the unique configuration of the clip slot permits facile insertion and removal of the stud therein to provide positive joint securement and yet permit removal thereof without the necessity of any tool manipulation or the provision of any access opening to the joint.

DESCRIPTION OF THE PREFERRED EMBODIMENTS

Figure 2:
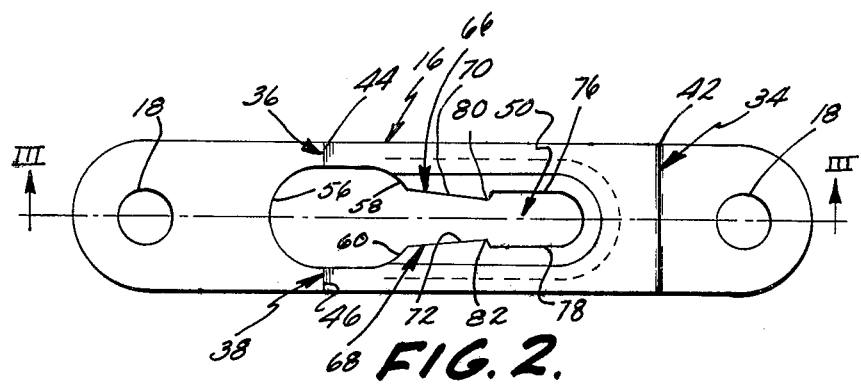
FIG. 2 is a plan view of the fastener clip illustrated in FIG. 1.
Figure 3:
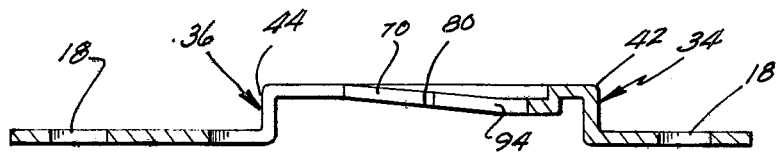
FIG. 3 is a side elevation view in cross section of the fastener clip illustrated in FIG. 2 taken along lines III—III.
Figure 4:
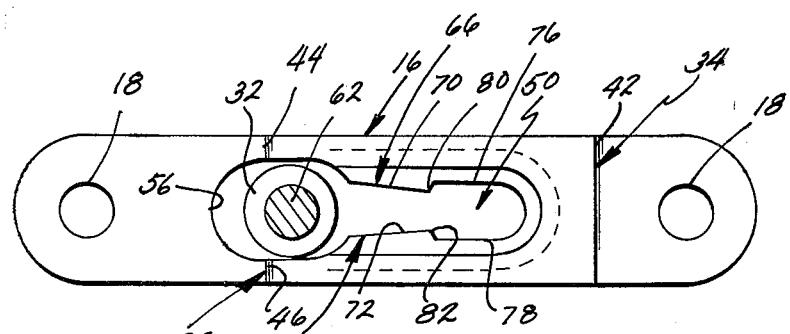
FIG. 4 is a plan view similar to FIG. 2 illustrating the stud inserted within the slot opening.
Figure 1:
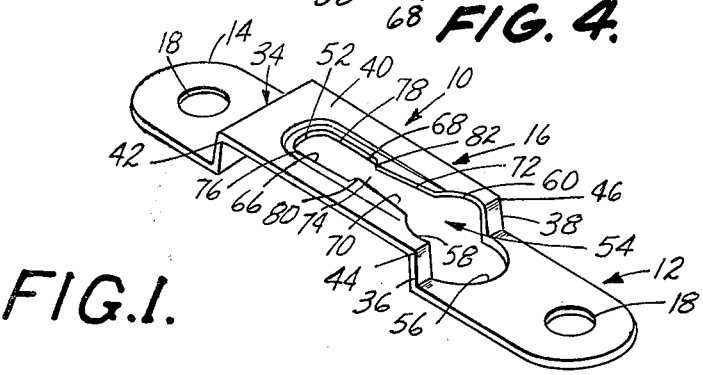
FIG. 1 is a perspective view of the preferred embodiment of the invention.
Figure 5:
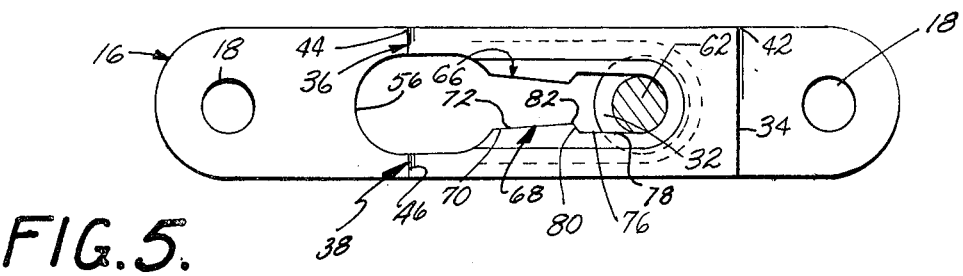
FIG. 5 is a view similar to FIG. 4 with the stud illustrated in the secured position.
Figure 6:
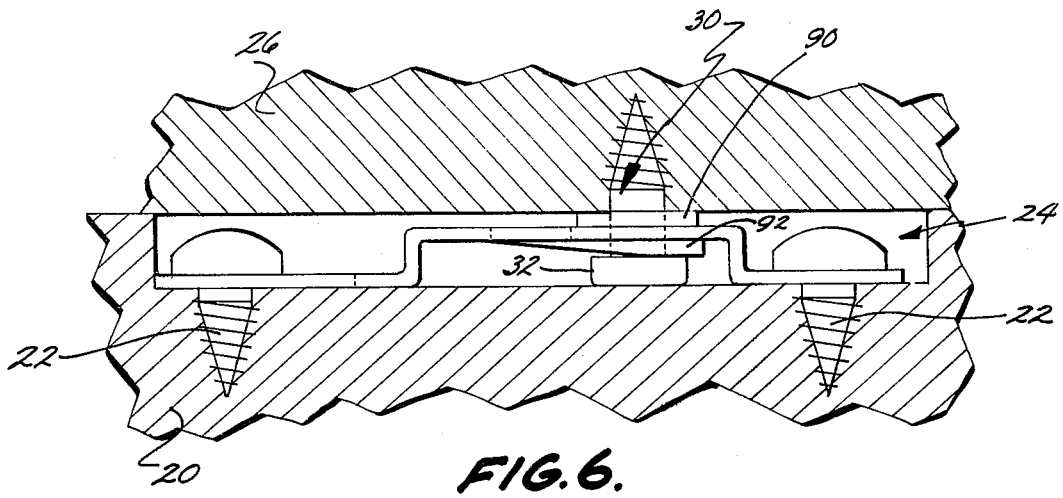
FIG. 6 is a cross section view of a joint illustrating two structural members joined together by the fastener clip of the invention.

Referring now to the drawings in detail, FIGS. 1–6 illustrate one particular form of the fastener clip of my invention. The clip 10 has two end flanges 12, 14, and a central raised portion 16. An opening 18 is provided in each end portion to permit positive securement of the clip to a joint structure 20 (FIG. 6) by threaded fasteners 22 or the like. The particular joint structure 20 illustrated in FIG. 6 has a clip recess 24 which hides the fastening member from view when the joint structures are joined together. A second joint structure 26 is illustrated in FIG. 6 and includes a stud 30 threaded into or otherwise anchored to structure 26. Stud 30 has an enlarged head 32 which cooperates uniquely with clip 10 to join the two joint structures 20 and 26 together as will be described hereinafter.

The generally raised central portion 16 is joined to an upstanding end wall 34 at one end and to spaced upstanding legs 36 and 38 at the other end. Upstanding legs 36 and 38 are joined to end flange 12 while end flange 14 joins the bottom portion of end wall 34. A top wall 40 is formed between the end wall 34 and the upstanding legs 36 and 38. A corner 42 is formed between top wall 40 and upstanding end wall 34 while spaced corners 44 and 46 are formed respectively between top wall 40 and upstanding legs 36 and 38.

A slot 50 is formed in central portion 16 and extends into the central portion of top wall 40 near corner 42. Slot 50 is defined by a closed end 52 and an open end 54 which extends to and communicates with the opening between legs 36 and 38. An extended opening portion 56 is formed in flange 12 for receipt of the enlarged head 32 of stud 30. The terminal end of slot 50 includes the curved surfaces 58 and 60 having a radius of curvature corresponding to that of opening 56 to permit insertion of enlarged head 32 into the opening 56 to permit longitudinal movement of the shaft portion 62 of stud 30 along slot 50 with head 32 being positioned beneath top wall 40.

Slot 50 includes opposite sides 66 and 68 having first portions 70 and 72 which taper inwardly toward each other reducing the normal width of slot 50 to a locus of minimum width at 74. At this point, the slot width widens abruptly forming second slot portions 76, 78 of increased width terminating at end wall 52. The sidewalls at the locus of minimum width 74 form steps 80, 82. First portions 70, 72 form ramps which are cammed apart as shaft 62 is urged longitudinally from the open end of slot 50 to the closed end. As soon as shaft 62 clears the locus of minimum width 74 at eliminated. 80, 82, the sides snap back into their normal position illustrated in the drawing and shaft 62 is locked into place behind steps 80, 82 as illustrated in FIG. 5. This prevents unintentional disengagement of the shaft from clip 10 unless sufficient force is generated to force the shaft back through the locus of minimum width 74. The normal forces generated during use of the structures however will not be sufficient to do this. The stud is disengageable from slot 50 however without requiring the manipulation of any mechanical tools and hence the requirement of an access opening is eliminated.

OPERATION

Having described the fastener clip 10 in detail, the engagement and disengagement of stud 30 therefrom should be obvious. Referring to FIG. 6, if fastener clip 10 is anchored within recess 24 of a first structure 20, and stud 30 is anchored to a second structure 26, the two structures are fastened together by inserting stud 30 into the open end of slot 50 and the partial opening 56 in flange 12. The head is inserted so that it is below the plane of top wall 40 of central raised portion 16 and second structure 26 is then moved longitudinally so that enlarged head 32 becomes captured beneath top wall 40 along each side 66 and 68 of slot 50. The diameter of shaft 62 corresponds essentially to the initial opening width of slot 50 which matches that of increased width portions 76 and 78. As shaft 62 is urged toward closed end 52, sides 66 and 68 flex outwardly by the camming action between shaft 62 and tapered side portions 70, 72. Once shaft 62 is urged past steps 80, 82, the sides flex inwardly and the shaft and enlarged head are locked securely to fastener clip 10. Disengagement is achieved by exerting a larger force in the opposite direction to pop sides 66 and 68 outwardly so that shaft 62 clears steps 80 and 82.

In the preferred embodiment, stud 30 includes an enlarged annular flange 90 having a diameter greater than enlarged head 32 spaced from head 32 a distance slightly greater than the thickness of top wall 40. Flange 90 acts as an index means when stud 30 is inserted into structure 36 locating the protrusion of enlarged head 32 the desired distance. Flange 90 also bears down on the upper surface of top wall 40 when the stud is inserted as described above.

Preferably, top wall 40 is indented around the periphery of slot 50 forming a pair of wedging surfaces 92, 94 which taper downwardly to closed end 52 of slot 50. When stud 30 is positioned in slot 50, the enlarged head 32 will be drawn downwardly toward the planes of end flanges 12 and 14 as stud 30 is moved relative to fastener clip 10 in a direction from open end 54 to closed end 52. This tensions the clip securely to stud 30 and the wedging nature and flexibility of the clip permits more latitude in tolerances during manufacture without pulling the screw or clip from the particular structure they are attached to.

FIRST ALTERNATIVE EMBODIMENT

Figure 7:
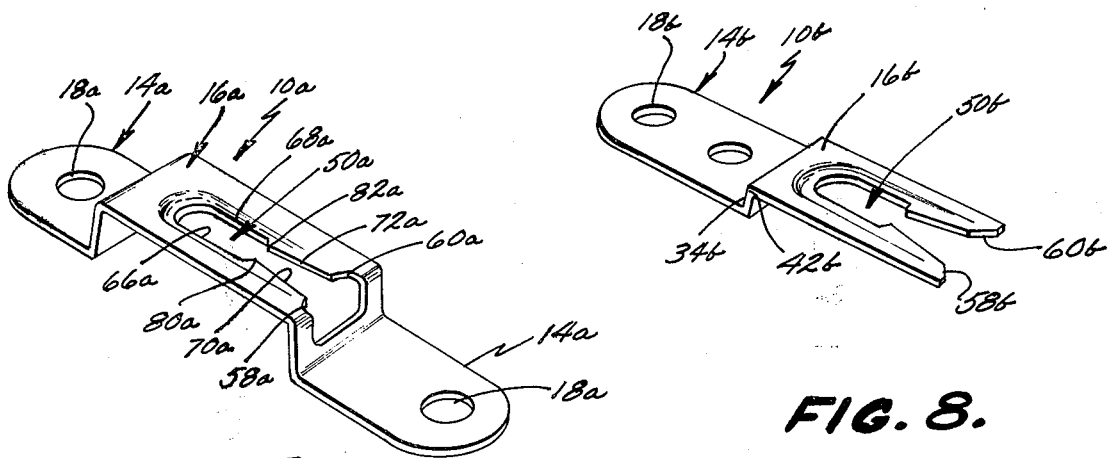
FIG. 7 is a perspective view of a first alternative embodiment of the invention.

Referring now to FIG. 7, an alternative fastener clip 10a is illustrated which provides a different form of entry of stud 30 than that described above. Fastener clip 10a is identical in many respects to clip 10 described above and hence the suffix a is utilized to describe like elements.

In clip 10, entry of stud 30 into position for manipulation which clip 10 is in a direction normal to the clip itself. Clip 10a however has a central raised portion 16a raised substantially higher with relationship to end flanges 12a and 14a whereby opening portion 56 formed in flange 12 of clip 10 is not required. Thus, the overall length of clip 10a relative clip 10 is less and stud 30 is placed into position in either the same fashion or by simple longitudinal sliding. The structural configuration of slot 50a however is identical to that illustrated in the embodiment of FIGS. 1–6 as is the insertion and removal of stud 30.

SECOND ALTERNATIVE EMBODIMENT

Figure 8:
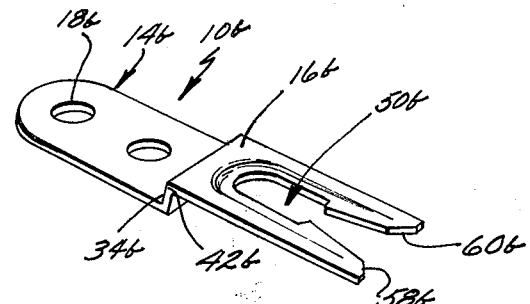
FIG. 8 is a perspective view of a second alternative embodiment.

FIG. 8 illustrates yet another modified fastener clip 10b. Clip 10b is most noticeably distinguishable from clips 10 and 10a in that end flange 12 and legs 36 and 38 are eliminated. End flange 14b is extended slightly and a pair of openings 18b are positioned in end flange 14b to permit positive securement to a support structure. The flared ends 58b and 60b of slot 50b are illustrated as being slanted instead of curved since stud 30 is inserted into slot 50b directly from the end of clip 10b. The remaining operation however is identical to that described previously with regards to the embodiments of FIGS. 1–6 and FIG. 7.

Although several embodiments have been shown and described in detail, it will be obvious to those having ordinary skill in this art that the details of construction of these particular embodiments may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. A fastener clip for use in a joint structure comprising, in combination: a one-piece metal plate having an end flange and a raised portion connected thereto by a wall means, said metal plate being made of a strong resilient material; means defining a slot formed in said raised portion, said slot having an access opening at one end to receive a stud having an enlarged head, said sides of said slot having a first portion extending from said access opening to a transition point intermediate said opening and other slot end and a second portion extending from said other slot end to said transition point, said first side portions being resilient and tapered inwardly toward each other to said transition point, the width of said slot being a minimum at said transition point, said second side portions extending from said transition point and spaced from each other a distance greater than the said minimum slot width, said transition point forming a step acting as a lock whereby a stud having a shaft diameter slightly less than the spacing of said second slot side portions and an enlarged header portion is positioned in said access opening of said slot and moved longitudinally to said other end, the shaft of said stud flexing said tapered portions which portions snap back into their normal position when said shaft is moved beyond said transition point and locked into said second slot portions to prevent unintentional removal of said stud from said fastener.

2. The combination according to claim 1 wherein said other end of said slot is positioned intermediate said one end and said wall means.

3. The combination according to claim 1 wherein the terminal ends of said sides at said access opening are flared outwardly to guide the shaft when inserted in said slot.

4. The combination according to claim 1 wherein said steps of said sides of said slot are sloped abruptly away from the point of said minimum slot width.

5. The combination according to claim 1 wherein said second side portions are generally parallel to each other.

6. The combination according to claim 1 wherein said metal plate includes a second end flange spaced from said first end flange, said raised portion extending intermediate said end flanges, said second end flange being connected to said central portion by a second upstanding wall means.

7. The combination according to claim 6 wherein said second upstanding wall means is comprised of a pair of spaced upstanding legs forming an opening therebetween.

8. The combination according to claim 7 wherein said access opening in said slot extends to and communicates with said opening between said legs, said other end of said slot being at a point intermediate the ends of said central portion.

9. The combination according to claim 8 wherein said second end flange includes an opening communicating with said opening between said legs, the cross-sectional diameter of said opening corresponding to the spacing of said legs, and the width of said slot at said access opening portion communicating with said opening between said legs and likewise corresponding to the spacing between said legs.

10. A joint structure comprising: a first panel member and a second panel member having surfaces in contacting relationship; said first panel member having a recessed area along a surface in contact with said second panel; a clip fastened in said recessed area, said clip being constructed according to claim 1 with said flange being fastened to the bottom of said recess and said raised portion being spaced above the bottom of said recess in close proximity to but below the plane of said surface in contact with said second panel; a stud member fixed in said second panel, said stud having an enlarged head extending above and spaced from the surface in contact with said first panel member and juxtaposed to said recessed area of said first panel member, said enlarged head being positioned beneath said raised portion within said slot and behind said steps so as to strongly and yieldingly hold said first and second panel members in contact with each other.

11. A joint structure according to claim 10 wherein said clip is constructed according to claim 10 with said first and second flanges being fastened to the bottom of said recess.

12. A resilient fastener clip for use in a joint structure comprising a one-piece metal plate having a first portion adapted for securement to a joint member and a second portion raised from said first portion, means defining a slot formed in said second portion, said slot having an access opening to permit insertion of a stud having an enlarged head whereby said head can be positioned intermediate the planes of said first and second plate portions with said stud extending through said slot, the width of slot decreasing gradually from a width greater than the diameter of said stud to a locus of minimum width and then abruptly increasing in width, said increased width slightly exceeding the diameter of said stud; and step means at said locus of said minimum width forming a lock whereby movement of the stud positioned in said access opening along said slot causes said slot sides to flex outwardly until said stud is moved past said step means, whereupon said slot sides snap back to their normal spacing and said stud is securely locked behind said step means preventing unintentional removal of said stud from said clip.

13. The fastener clip according to claim 12 wherein said first portion includes a flange at each end, and said second portion is a central portion intermediate said flange ends.

14. The fastener clip according to claim 13 wherein each of said end flanges are connected to said central portion by a wall means.

15. The fastener clip according to claim 14 wherein one of said wall means is comprised of a pair of spaced upstanding legs forming an opening therebetween, said access opening extending to and communicating with said opening between said legs.

* * * * *